May 24, 1960 F. W. SCHEIFELE 2,937,468
FISHING SINKER
Filed Nov. 10, 1958
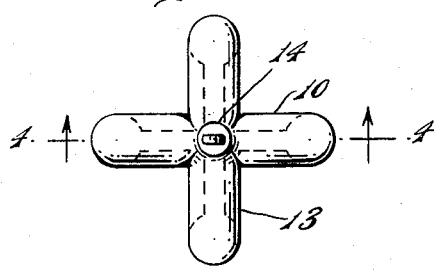
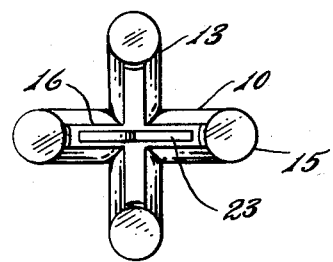
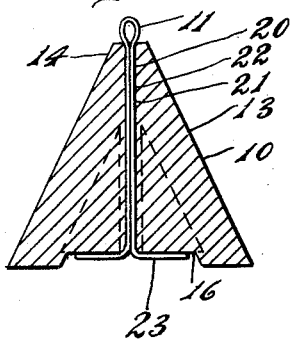
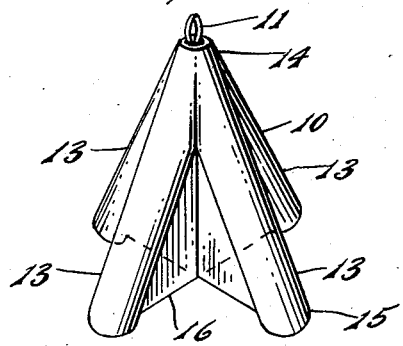
INVENTOR
Frederick W. Scheifele
BY
Wm. Steell Jackson and Sons
ATTORNEYS.

United States Patent Office 2,937,468
Patented May 24, 1960

2,937,468
FISHING SINKER
Frederick W. Scheifele, 243 White Horse Pike, Audubon, N.J.
Filed Nov. 10, 1958, Ser. No. 773,008
1 Claim. (Cl. 43—43.1)

My invention relates to fishing sinkers.

A purpose of my invention is to furnish an improved sinker.

A further purpose is to provide a sinker having greatly increased holding power for a given weight.

A further purpose is to provide a sinker which will hold as well under given current and other conditions as a conventional sinker that is much heavier—more or less on the order of twice its weight, so that by use of this sinker the angler will not have to carry nearly as much weight in his tackle box, he can feel the strike of the fish better, and he will get more pleasure in playing the fish.

Further purposes will appear in the remainder of the specification and in the claim.

My invention is illustrated in the drawings by an embodiment chosen from the standpoint of convenience in illustration, satisfactory operation, and clear demonstration of the principles involved.

Figure 1 is a perspective view of a fishing sinker of my invention.

Figure 2 is a top plan view of the sinker of Figure 1.

Figure 3 is a bottom plan view of the same sinker.

Figure 4 is a vertical section along the lines 4—4 of Figure 2.

The sinker of my invention, in the particular embodiment shown in the drawings, consists of a body 10 and an eye member 11.

Body 10 in the form shown, considered in its normal position when resting on a flat horizontal surface, consists of four arms 13, which are merged together at top 14 of the body and from there spread symmetrically apart in the direction toward the bottom 15, and also of webbing 16 which connects the parts of the arms where they are apart.

The arms are preferably cylindrical in cross section between the bottom and the point where they come together and straight, with their bottoms collectively constituting parts of the one plane, and at the very top where they are completely merged preferably collectively constituting more or less a frustum of a cone. The top can have a considerable flat area or can if desired go up almost to a point. The angle between the longitudinal axis of the individual cylinder and the vertical axis of the sinker as a whole is preferably on the order of twenty five degrees. The arms are preferably solid and of substantial thickness, and most desirably of a diameter in their cylindrical portions on the order of one fifth of the maximum distance across the sinker at the bottom. The webbing 16 is preferably in the form of symmetrically positioned solid sheets extending across between opposite arms from the point of merger of the arms down to nearly the bottom. Thus the webbing taken as a whole is cruciform in cross-section. The sheets involved are preferably thinner than the arms, and most desirably have a thickness less than one half the diameter of the arms.

Body 10 is preferably one integral piece, which may if desired be produced by casting. Lead and zinc are examples of metals which may be used for it.

Eye 11 in the form shown is formed out of a cotter pin 20, with the head of the cotter pin forming the eye proper, located right above the top of body 10, shank 21 of the cotter pin passing down through central hole 22 in the body of the sinker and more specifically along its longitudinal axis, and bent-back ends 23 of the cotter pin holding it in the hole. This form would normally be made by casting the body with the central hole in it when it is cast, and then inserting the cotter pin, which can be of brass, and bending back the ends. However, I will preferably make my device by having a suitable eye including a shank in place at the time the body is cast, and casting the body around it so that the eye is molded right in at the time of casting.

When it is desired to use my fishing sinker, the eye is intended to be attached to the fishing line in the conventional manner.

I have found that the sinker of my invention in a given particular size has a holding power approximately equal to a conventional sinker of twice its weight. That is, with my sinker, to hold under a given set of current and other conditions, you need a sinker only half as heavy as the conventional sinker you would need in order to hold under the same conditions. As a result, not only does the use of my sinker greatly lighten the load which the fisherman has to carry around, but it makes it easier to feel the strike of the fish and gives more fun in playing the fish.

While I am not certain the reason my sinker has this greatly improved holding power, I think that it has something to do with the setting up of eddy currents by virtue of the special configuration of my sinker. I believe that the normal position of my sinker when resting on the bottom is an upright one with the longitudinal axis more or less vertical and the bottoms of the arms resting on the bottom, and that in this position eddy currents are formed as a result of any current which may impinge against it.

Furthermore, as far as I can tell from my experience, the sinker of my invention goes down much more nearly straight toward the bottom of the water than a conventional sinker. Thus, fishing pleasure starts almost as soon as it hits the water, since it gets down quicker to the fish, whereas a conventional sinker would be dragged out by the current before it got down.

Furthermore, when the boat is drifting, my sinker will glide along on the bottom with much less line out (normally only about half as much) than the conventional sinker.

My sinker is also comparatively free from any likelihood of snagging on wrecks or the like.

In view of my invention and disclosure variations and modifications to meet individual whim or particular need will doubtless become evident to others skilled in the art, to obtain all or part of the benefits of my invention without copying the article shown, and I therefore, claim all such insofar as they fall within the reasonable spirit and scope of my claim.

Having thus described my invention what I claim as new and desire to secure by Letters Patent is:

A fishing sinker comprising four solid cylinders of circular cross section, the axes of two of the cylinders lying in a plane at right angles to the plane in which the axes of the remaining two cylinders lie, the axes of the four cylinders converging and intersecting, the axis of each cylinder forming an angle of approximately 25° with the line of intersection of the said planes, flat webs lying between the cylinders in the said planes and having free ends terminating short of the free ends of said cylinders and intersecting the cylinders, and an eye extending from the sinker adjacent the point of intersection of the cylinder and said eye having a shank extending through said sinker substantially along the line of intersection of said planes and being bent to engage the free end of said webs.

References Cited in the file of this patent
UNITED STATES PATENTS

| | | |
|---|---|---|
| D. 162,660 | Humphrey | Mar. 27, 1951 |
| 1,127,747 | Fackenthall | Feb. 9, 1915 |
| 2,106,045 | Zamborsky | Jan. 18, 1938 |